United States Patent
Buckley

(10) Patent No.: US 9,454,360 B2
(45) Date of Patent: Sep. 27, 2016

(54) CHARACTERIZING INTERFACE EVOLUTION AND CONSUMER ROLES IN MODULE SYSTEMS

(75) Inventor: Alexander R. Buckley, Cupertino, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 613 days.

(21) Appl. No.: 12/939,634

(22) Filed: Nov. 4, 2010

(65) Prior Publication Data

US 2012/0117538 A1    May 10, 2012

(51) Int. Cl.
*G06F 9/44* (2006.01)

(52) U.S. Cl.
CPC .. *G06F 8/70* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 7,089,548 B2* | 8/2006 | Lin | 717/168 |
| 7,895,572 B2* | 2/2011 | Stienhans | 717/120 |
| 8,079,015 B2* | 12/2011 | Lind et al. | 717/120 |
| 2005/0138649 A1* | 6/2005 | Schwabe | 719/328 |
| 2007/0162904 A1* | 7/2007 | Kimmerly | G06F 8/71 717/162 |
| 2010/0095268 A1* | 4/2010 | Lowry et al. | 717/102 |

OTHER PUBLICATIONS

Gosling et al, "The Java Language Specification, Second Edition", 2000, Addison-Wesley.*
"Project Jigsaw: Language changes for Modules," Sun Microsystems, Feb. 3, 2009.*
OSGi Alliance "Semantic Versioning", Technical Whitepaper, dated May 6, 2010, www.osgi.org/wiki/uploads/links/semanticversioning.pdf.
OSGi Alliance Blog "Backward Compatibility", dated Jan. 26, 2010, www.osgi.org/blog/2010/01/backward-compatibility.html.

* cited by examiner

Primary Examiner — Lewis A Bullock, Jr.
Assistant Examiner — Christine Dang
(74) Attorney, Agent, or Firm — Park, Vaughan, Fleming & Dowler LLP

(57) ABSTRACT

The disclosed embodiments provide a system that facilitates the development and maintenance of a software program. This system includes a software development kit (SDK) and a runtime system for the software program. During operation, the system obtains a role associated with a dependency of a consumer in the software program on an interface. Next, the system obtains a compatibility policy for the interface. Finally, the system uses the role and the compatibility policy to manage use of the interface by the consumer in the software program.

18 Claims, 7 Drawing Sheets

CHARACTERIZING INTERFACE EVOLUTION AND CONSUMER ROLES IN MODULE SYSTEMS

RELATED APPLICATION

The subject matter of this application is related to the subject matter in a non-provisional application by inventors Mark B. Reinhold, Alexander R. Buckley, Jonathan J. Gibbons and Karen M P Kinnear, entitled "Polyphasic Modules for Software Development," having Ser. No. 12/771,121, and filing date 30 Apr. 2010.

BACKGROUND

1. Field

The present embodiments relate to module systems for software development. More specifically, the present embodiments relate to techniques for characterizing interface evolution and consumer roles in module systems.

2. Related Art

Within software systems, increasing sophistication and functionality are typically accompanied by corresponding increases in code size and complexity. For example, the addition of new features to a software program may require the implementation of new components, which in turn may increase the number of dependencies within the software program. Over time, changes to the software program may lead to increases in defects, debugging time, redundancy, and lack of readability. The continued development of a software system without effective complexity management may consequently reduce performance and increase maintenance risk to the point of rendering the software system unusable and/or unmanageable.

Issues associated with increasing software complexity may be mitigated by modularizing software systems. Modular software utilizes components that are self-contained and that facilitate a separation of concerns. For example, individual modules may be developed, tested, and used independently of each other in a software system. In addition, a module's functionality and dependencies may be explicitly declared through an interface provided by the module. Modularized software may thus be significantly more maintainable, easier to understand, and less complex than monolithic software.

Hence, increased use of modularity may improve the design, maintenance, performance, scalability, and growth of software systems.

SUMMARY

The disclosed embodiments provide a system that facilitates the development and maintenance of a software program. This system includes a software development kit (SDK) and a runtime system for the software program. During operation, the system obtains a role associated with a dependency of a consumer in the software program on an interface. Next, the system obtains a compatibility policy for the interface. Finally, the system uses the role and the compatibility policy to manage use of the interface by the consumer in the software program.

In some embodiments, the role identifies the consumer as a caller or an implementer of the interface.

In some embodiments, using the role and the compatibility policy to facilitate use of the interface by the consumer involves using the compatibility policy to characterize a change in the interface. If the change is characterized as a binary-incompatible change, the system disables use of the interface by the caller. If the change is characterized as a source-incompatible change, the system disables use of the interface by the implementer.

In some embodiments, the binary-incompatible change includes a removal of an existing function from the interface, and the source-incompatible change includes an addition of a new function to the interface.

In some embodiments, the change is characterized using a version of the interface and/or a reverse dependency constraint associated with the interface.

In some embodiments, the consumer is a class, a package, and/or a module.

In some embodiments, the role is declared by the consumer or inferred from type declarations in the consumer.

In some embodiments, the compatibility policy is applied to the interface, a set of interfaces, or the software program.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The functions and processes described in the detailed description section can be embodied as code and/or data, which can be stored in a computer-readable storage medium as described above. When a computer system reads and executes the code and/or data stored on the computer-readable storage medium, the computer system performs the functions and processes embodied as data structures and code and stored within the computer-readable storage medium.

Furthermore, functions and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the functions and processes included within them.

Figure 1:
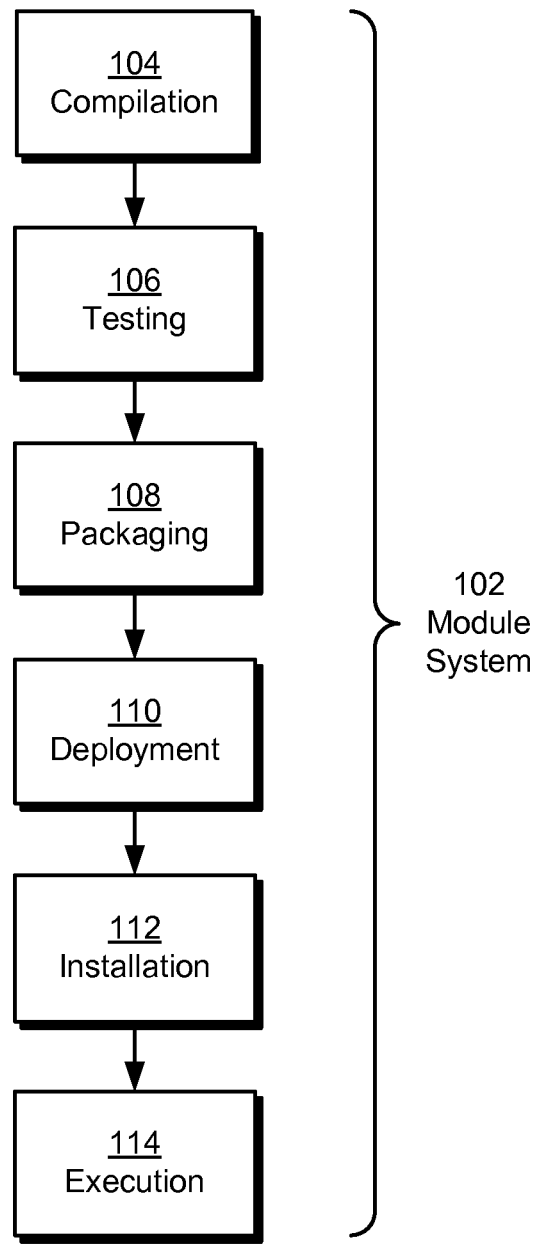
FIG. 1 shows the life cycle of a software program in accordance with an embodiment.

FIG. 1 shows the life cycle of a software program in accordance with an embodiment. The life cycle begins with a compilation 104 phase, in which source code for the software program is converted into an executable format. Next, the compiled software program undergoes a testing 106 phase to detect failures, defects, and/or other issues in the implementation of the software program. For example, testing 106 may be carried out to analyze the correctness, security, scalability, performance, maintainability, and/or usability of the software program.

After testing 106, packaging 108 of the software program may involve creating a software package in an archive format from the software program's executable code. The software package may then undergo deployment 110 and installation 112 on a computer system. For example, a web application may be deployed and installed on a server computer, while a native application may be deployed and installed on multiple personal computers. Finally, execution 114 of the software program allows the software program's intended functionality to be provided to an end user.

Those skilled in the art will appreciate that changes such as patches, upgrades, maintenance, and/or new releases may be periodically made to the software program. Moreover, such changes may be propagated through some or all of the phases of the life cycle. For example, the addition of new features to the software program may require that the software program be recompiled, tested, packaged, deployed, installed, and executed with the new features.

Those skilled in the art will also appreciate that changes to the software program may increase the complexity of the software program, which may eventually interfere with the maintainability, usability, and/or performance of the software program. For example, modifications to the software program may be difficult to document and/or track across all phases 104-114 of the software program's life cycle. Over time, such modifications may interfere with the continued use and development of the software program by obscuring the design of the software program, increasing redundancy, and introducing new, unknown dependencies among components in the software program.

To mitigate issues associated with increased software complexity, a module system 102 may be used to facilitate the development and maintenance of the software program. In one or more embodiments, module system 102 uses modular information at all phases 104-114 of the life cycle to manage dependencies in the software program. Such polyphasic modularization may facilitate the development of the software program by improving transparency, cohesion, performance, scalability, and maintainability in the software program. Management of polyphasic modules is discussed in a co-pending non-provisional application by inventors Mark Reinhold, Alexander Buckley, Jonathan Gibbons, and Karen Kinnear, entitled "Polyphasic Modules for Software Development," having Ser. No. 12/771,121, and filing date 30 Apr. 2010, which is incorporated herein by reference.

Figure 2:
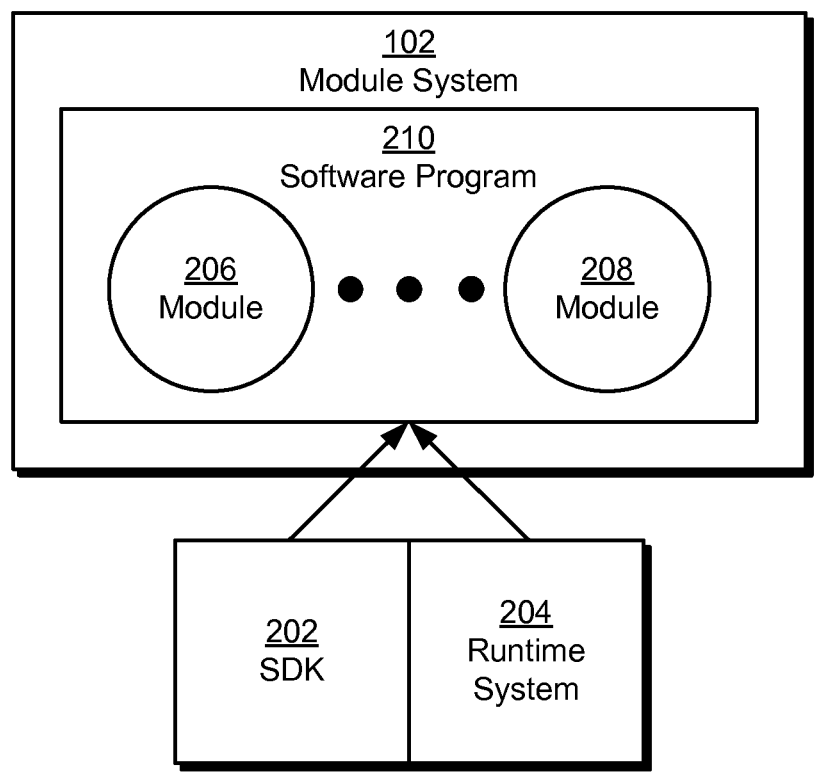
FIG. 2 shows the development and maintenance of a software program using a module system in accordance with an embodiment.

FIG. 2 shows the development and maintenance of a software program 210 using module system 102 in accordance with an embodiment. As shown in FIG. 2, a software development kit (SDK) 202 and a runtime system 204 may interact with module system 102 to manage software program 210 across all stages of the life cycle of software program 210. For example, SDK 202 and runtime system 204 may correspond to the Java (Java™ is a registered trademark of Oracle America, Inc.) Development Kit (JDK) and Java Runtime Environment (JRE).

As mentioned above, module system 102 may use polyphasic modules to facilitate the development of software program 210. In particular, polyphasic modularization of software program 210 may begin with the creation of module declarations for a set of modules 206-208 to be used in software program 210.

In one or more embodiments, modules 206-208 correspond to standalone components in software program 210 that may be independently programmed, tested, and modified. Each module 206-208 may be defined, organized, and used through a corresponding module identity and module declaration. In addition, an interface to a module may be based on the members of the module. For example, the module may be accessed through public functions and/or data in the module's members. Logical boundaries between modules 206-208 may further be enforced by enabling inter-module interaction only through the interfaces to the modules, thus effectively hiding implementation details of modules 206-208 from one another.

In other words, modules 206-208 may correspond to encapsulated abstractions of functionality in software program 210 with well-defined capabilities and dependencies. Modules 206-208 may thus provide a large amount of flexibility in organizing the structure of software program 210. For example, Java classes may be grouped into modules 206-208 based on the functionality and/or use of the classes in software program 210 instead of language-based constraints such as package membership.

In one or more embodiments, module declarations for modules 206-208 are obtained separately from source code for software program 210. For example, module declarations for modules 206-208 in a Java program may be stored in module definition files that are separate from source files containing Java classes, interfaces, enumerations, and/or annotation types. Such decoupling of module declarations from module implementations may further enable the creation of modules 206-208 based on factors that facilitate the design and development of software program 210, such as separation of concerns, scalability, and performance.

The independent creation and procurement of module declarations may additionally allow module system 102 to begin modularizing software program 210 before software program 210 is compiled. For example, module system 102 may allow module declarations for modules 206-208 to be created (e.g., using SDK 202) before development of source code for software program 210 is complete. Module system 102 may proceed with using the module declarations to manage dependencies in software program 210 through the compilation, testing, packaging, deployment, installation, and execution phases of the life cycle of software program 210.

In one or more embodiments, SDK 202 and runtime system 204 provide mechanisms for characterizing the evolution of interfaces for modules 206-208 and determining the impact that changes to the interfaces may have on consumers of modules 206-208. First, SDK 202 and runtime system 204 may obtain a role associated with a dependency of a consumer in software program 210 on an interface. The role may identify the consumer as a caller of the interface and/or an implementer of the interface. Next, SDK 202 and runtime system 204 may obtain a compatibility policy for the interface. The compatibility policy may characterize changes to the interface over time.

SDK 202 and runtime system 204 may then use the role and compatibility policy to assess the compatibility of the interface with the consumer. In particular, SDK 202 and runtime system 204 may use the compatibility policy to characterize a change in the interface as binary-incompatible and/or source-incompatible.

The binary-incompatible change may correspond to removal of an existing function from the interface, while the source-incompatible change may correspond to addition of a new function to the interface. As a result, use of the interface may be disabled for callers of the interface if the change is binary-incompatible. Conversely, if the change is source-incompatible, use of the interface may be disabled for implementers of the interface. SDK 202 and runtime system 204 may thus use the compatibility policy and role to manage use of the interface by the consumer in software program 210, as discussed in further detail below.

Figure 3:
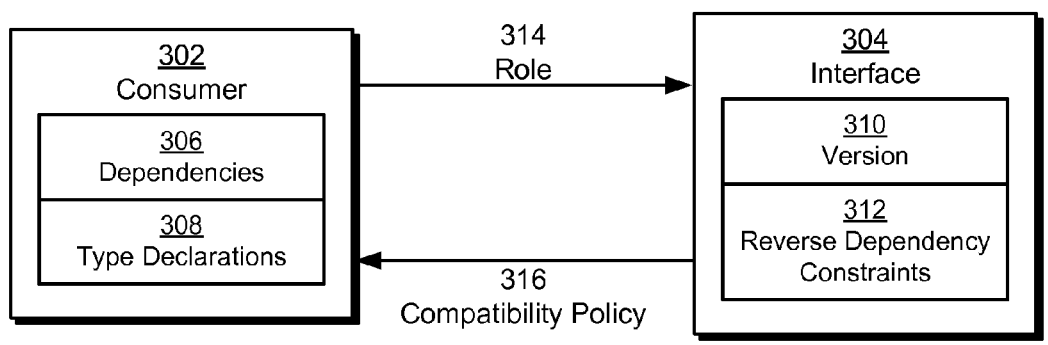
FIG. 3 shows the role-based management of interaction between a consumer and an interface in accordance with an embodiment.

FIG. 3 shows the role-based management of interaction between a consumer 302 and an interface 304 in accordance with an embodiment. Consumer 302 may correspond to a component in a software program with a set of dependencies 306 and a set of type declarations 308. For example, consumer 302 may be a class, package, library, module, distributed object, and/or compilation unit.

Interface 304 may define a set of functions through which components in the software program may interact. For example, interface 304 may correspond to an application programming interface (API), an abstract class or type, a module interface, and/or other entity that provides a point of interaction between software components. Consequently, consumer 302 may include a dependency on interface 304 if consumer 302 uses interface 304 to interact with other components in the software program. For example, consumer 302 may be a Java compilation unit that declares a dependency on interface 304 through a module declaration, package import statement, method call, and/or implementation of interface 304.

Furthermore, the dependency of consumer 302 on interface 304 may be associated with a role 314. As mentioned above, role 314 may identify consumer 302 as a caller and/or implementer of interface 304. In particular, role 314 may identify consumer 302 as a caller of interface 304 if consumer 302 calls functions defined in interface 304, or role 314 may identify consumer 302 as an implementer of interface 304 if consumer 302 implements functions defined in interface 304.

Role 314 may also be obtained in a variety of ways. For example, role 314 may be explicitly declared in a module and/or package declaration for consumer 302 using an identifier such as "calls" or "implements," or role 314 may be inferred from the use of Java keywords such as "extends" or "implements" in type declarations 308.

In one or more embodiments, role 314 facilitates use of interface 304 by allowing changes to interface 304 to be characterized in terms of compatibility with consumer 302.

Such characterization may further be enabled by obtaining a compatibility policy 316 that describes the "evolution" of interface 304 over time as new functions are added to interface 304 and existing functions are modified and/or removed. For example, compatibility policy 316 may identify the types of changes (e.g., additions, modifications, deletions) included in newer versions of interface 304, as well as the functions affected by the changes. As with role 314, compatibility policy 316 may be explicitly stated or inferred. For example, compatibility policy 316 may be specified using one or more reverse dependency constraints 312 of interface 304, as discussed below with respect to FIG. 4. Alternatively, compatibility policy 316 may be deduced by identifying patterns in changes made across different versions of interface 304.

More specifically, role 314 may be compared with compatibility policy 316 to determine if a given version 310 of interface 304 is compatible with consumer 302. First, changes included in version 310 of interface 304 may be characterized using compatibility policy 316. In addition, each change may be characterized as a binary-incompatible change that removes an existing function from interface 304 and/or as a source-incompatible change that adds a new function to interface 304. The binary-incompatible change may thus produce an error (e.g., runtime error) if a call to the removed function is attempted, while the source-incompatible change may produce an error (e.g., compilation error) if an implementation of interface 304 does not include the added function and is thus incomplete. Conversely, the binary-incompatible function removal may not interfere with an implementation of interface 304 that still contains the removed function. Along the same lines, the source-incompatible function addition may not affect calls to existing functions defined by interface 304.

As a result, use of version 310 of interface 304 by consumer 302 may be disabled if role 314 identifies consumer 302 as a caller and version 310 contains a binary-incompatible change. Likewise, use of version 310 of interface 304 by consumer 302 may be disabled if role 314 identifies consumer 302 as an implementer and version 310 contains a source-incompatible change. Incompatibilities between consumer 302 and version 310 may then be resolved by matching consumer 302 with older versions of interface 304 that do not conflict with the method calls and/or implementations of consumer 302.

Those skilled in the art will appreciate that changes to interface 304 may prevent both callers and implementers from using interface 304 unless corresponding changes are made to the method calls to and/or implementations of interface 304. For example, a new version of interface 304 may contain both function additions and deletions and/or modify existing functions from a previous version of interface 304. To mitigate changes required of consumers (e.g., consumer 302) to maintain compatibility with new versions of interface 304, compatibility policy 316 may specify a set of rules that guide the creation of new versions of interface 304 based on changes to interface 304.

For example, compatibility policy 316 may allow binary-incompatible changes to be made to interface 304 when a minor component of version 310 is incremented (e.g., "y" in version "x.y.z") and source-incompatible changes to be made when a major component of version 310 is incremented (e.g., "x" in version "x.y.z"). As a result, a version increase from 1.0 to 1.1 may be used by implementers of version 1.0 but not by callers of version 1.0. However, a version increase from 1.0 to 2.0 may contain significant changes that prevent both callers and implementers of version 1.* from using version 2.0.

Conversely, compatibility policy 316 may allow source-incompatible changes when a minor component of version 310 is incremented and binary-incompatible changes when a major component of version 310 is incremented. Callers of version 1.0 may thus be able to use any version that is at least 1.0 and less than 2.0, while implementers of version 1.0 may not be able to use even version 1.1.

As another example, compatibility policy 316 may allow binary-incompatible changes to be included in odd-numbered minor versions and source-incompatible changes to be included in even-numbered minor versions. Consequently, a version change from 1.0 to 1.1 may be used by implementers of version 1.0 but not by callers of version 1.0. In turn, a version change from 1.1 to 1.2 may be used by callers of version 1.1 but not by implementers of version 1.1.

Furthermore, compatibility policy 316 may be applied to interface 304, a set of interfaces containing interface 304, and/or the software program. In other words, compatibility policy 316 may have a scope that is local to interface 304, specific to a set of interfaces, and/or global. Local compatibility policies may additionally override global compatibility policies to allow interface providers to select compatibility policies for individual interfaces. For example, a compatibility policy for one interface may utilize a three-component version (e.g., 1.0.0) for the interface to enable finer-grained tracking of changes to the interface, while another compatibility policy for a different interface may use a two-component version (e.g., 3.1) to describe changes to the interface.

Those skilled in the art will also appreciate that roles and compatibility policies may be used to manage interaction among software components outside module-based environments. In particular, consumer roles and compatibility policies may be utilized in any environment that decouples software functionality from implementation and/or manages dependencies among software components. For example, roles and compatibility policies may mitigate incompatibility and/or simplify dependency resolution among components of object-oriented software programs, distributed objects, and/or software frameworks.

Figure 4:
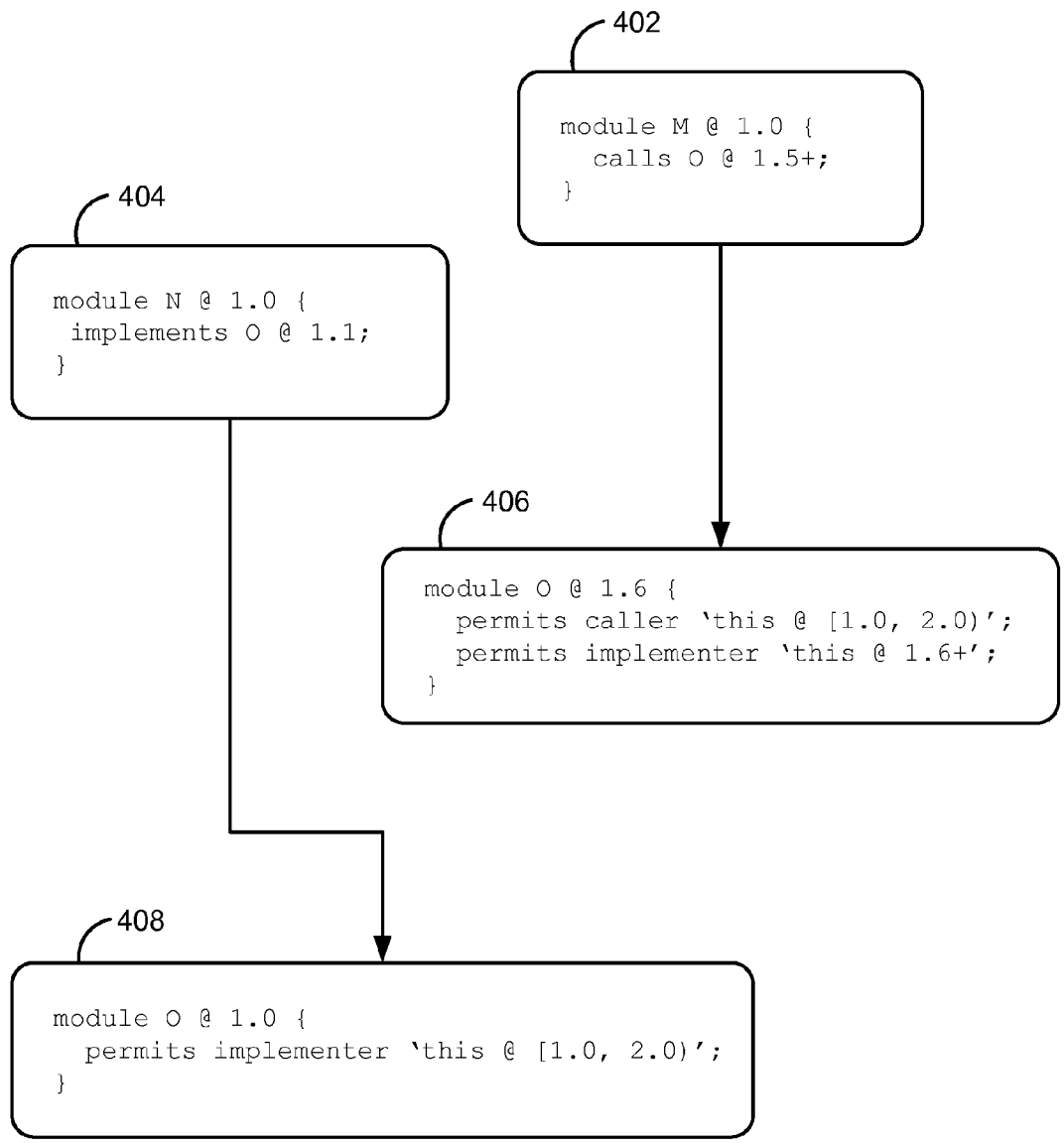
FIG. 4 shows an exemplary use of consumer roles and compatibility policies in a software program in accordance with an embodiment.

FIG. 4 shows an exemplary use of consumer roles and compatibility policies in a software program in accordance with an embodiment. As shown in FIG. 4, four modules 402-408 are associated with module declarations that identify the modules and specify the modules' dependencies. In particular, module 402 includes a name of "M @ 1.0" and one dependency (e.g., "calls O @ 1.5+"). Module 404 has a name of "N @ 1.0" and a dependency of "implements O @ 1.1." Module 406 has an identity of "O @ 1.6" and two reverse dependency constraints (e.g., "permits caller 'this @ [1.0, 2.0)'," "permits implementer 'this @ 1.6+'"), and module 408 has an identity of "O @ 1.0" and a reverse dependency constraint of "permits implementer 'this @ [1.0, 2.0)'."

Moreover, the identifiers "calls" and "implements" in module declarations for modules 402-404 may identify module 402 as a caller of "O @ 1.5+" and module 404 as an implementer of "O @ 1.1." In other words, roles associated with the dependencies of modules 402-404 on interfaces provided by other modules (e.g., modules 406-408) may be explicitly declared in the module declarations for modules 402-404.

Similarly, reverse dependency constraints of modules 406-408 may specify compatibility policies for the interfaces provided by modules 406-408. First, module 406 includes a reverse dependency constraint of "permits caller 'this @ [1.0, 2.0)'." As a result, the compatibility policy for module 406 may allow other modules to call functions in module 406 if the other modules express a dependency on a module with the same name as module 406 (e.g., "O") and a version ranging between 1.0 inclusive and 2.0 exclusive. Because module 402 claims a dependency on version 1.5 or higher of module "O," module 402 is able to use module 406 as a caller.

On the other hand, the second reverse dependency constraint of module 406 (e.g., "permits implementer 'this @ 1.6+'") may prevent module 404 from using module 406 as an implementer because module 404 claims a dependency on a version (e.g., "1.1") of module "O" that is too low to meet the reverse dependency constraint. For example, module 404 may not be allowed to implement module 406 because the interface provided by module 406 includes functions that are not in the interface of the "O @ 1.1" module that module 404 claims to implement. Instead, module 404 may use the interface of module 408, which has a reverse dependency constraint (e.g., "permits implementer 'this @ [1.0, 2.0)'") that is satisfied by the dependency of module 404.

Figure 5:
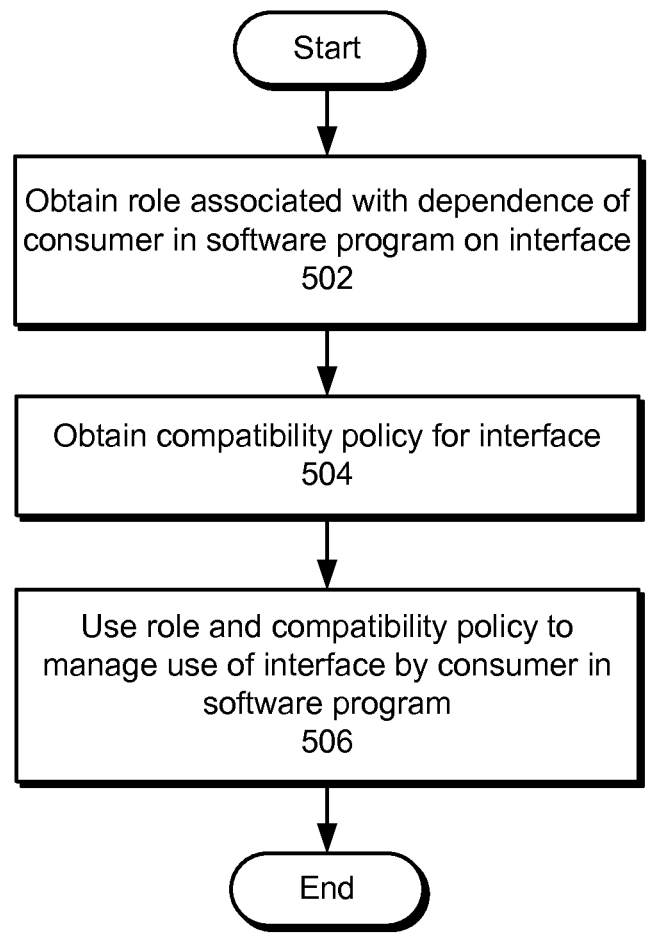
FIG. 5 shows a flowchart illustrating the process of facilitating the development and maintenance of a software program in accordance with an embodiment.

FIG. 5 shows a flowchart illustrating the process of facilitating the development and maintenance of a software program in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

First, a role associated with a dependency of a consumer in a software program on an interface is obtained (operation 502). The role may identify the consumer (e.g., module, package, class) as a caller and/or an implementer of the interface. In addition, the role may be declared by the consumer or inferred from type declarations in the consumer.

Next, a compatibility policy for the interface is obtained (operation 504). As with the role, the compatibility policy may be declared by the interface or inferred from changes in the interface over time. Finally, the role and the compatibility policy are used to manage use of the interface by the consumer in the software program (operation 506). Role-based management of interaction between consumers and interfaces is discussed in further detail below with respect to FIG. 6.

Figure 6:
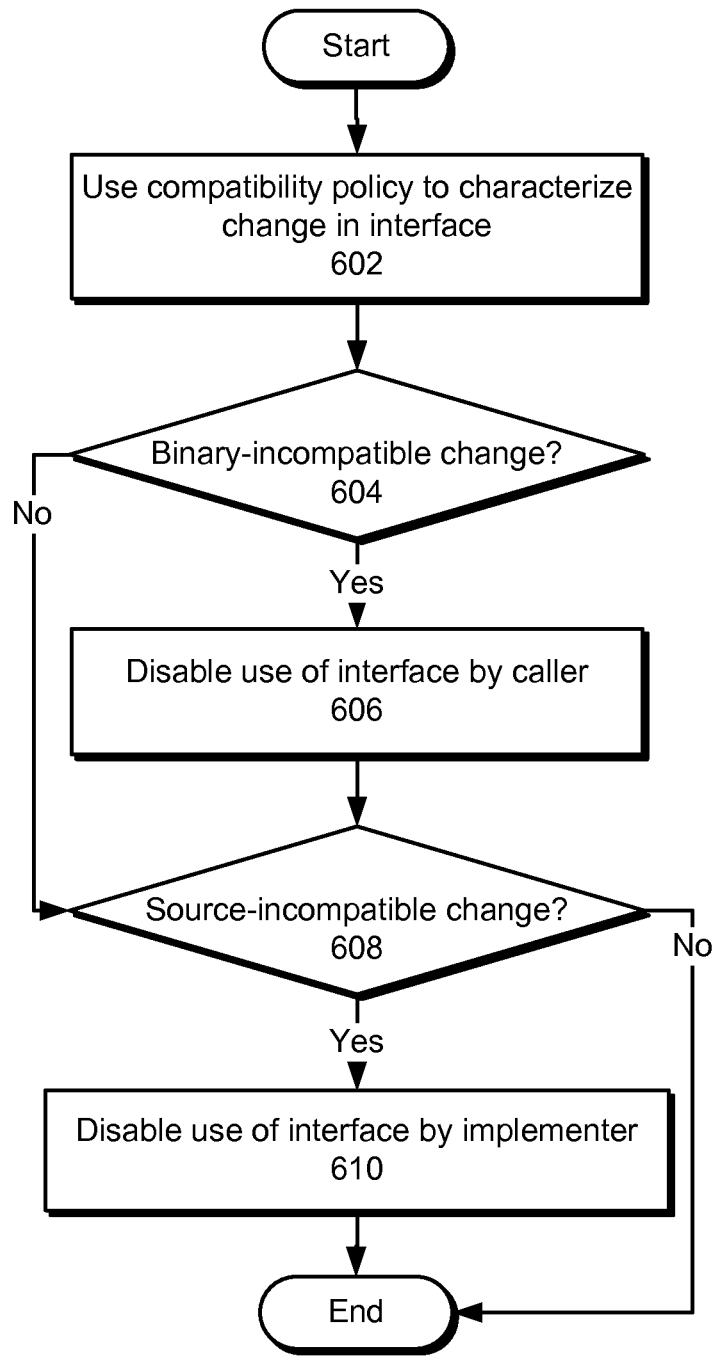
FIG. 6 shows a flowchart illustrating the process of using a role and a compatibility policy to manage use of an interface by a consumer in accordance with an embodiment.

FIG. 6 shows a flowchart illustrating the process of using a role and a compatibility policy to manage use of an interface by a consumer in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

Initially, the compatibility policy is used to characterize a change in the interface (operation 602). For example, the compatibility policy may specify a set of rules that guide the creation of new versions of the interface based on changes to the interface. The characterized change may be a binary-incompatible change (operation 604) that removes an existing function from the interface. If the change is characterized as a binary-incompatible change, use of the interface by a caller is disabled (operation 606) to prevent the caller from calling the removed function. If the change is not binary-incompatible, callers may continue using the interface safely.

On the other hand, the characterized change may be a source-incompatible change (operation 608) that adds a new function to the interface. If the change is characterized as a source-incompatible change, use of the interface by an implementer is disabled (operation 610) to prevent the implementer from attempting to implement the interface without implementing the new function. If the change is neither binary-incompatible nor source-incompatible, both callers and implementers may continue to use the interface.

Figure 7:
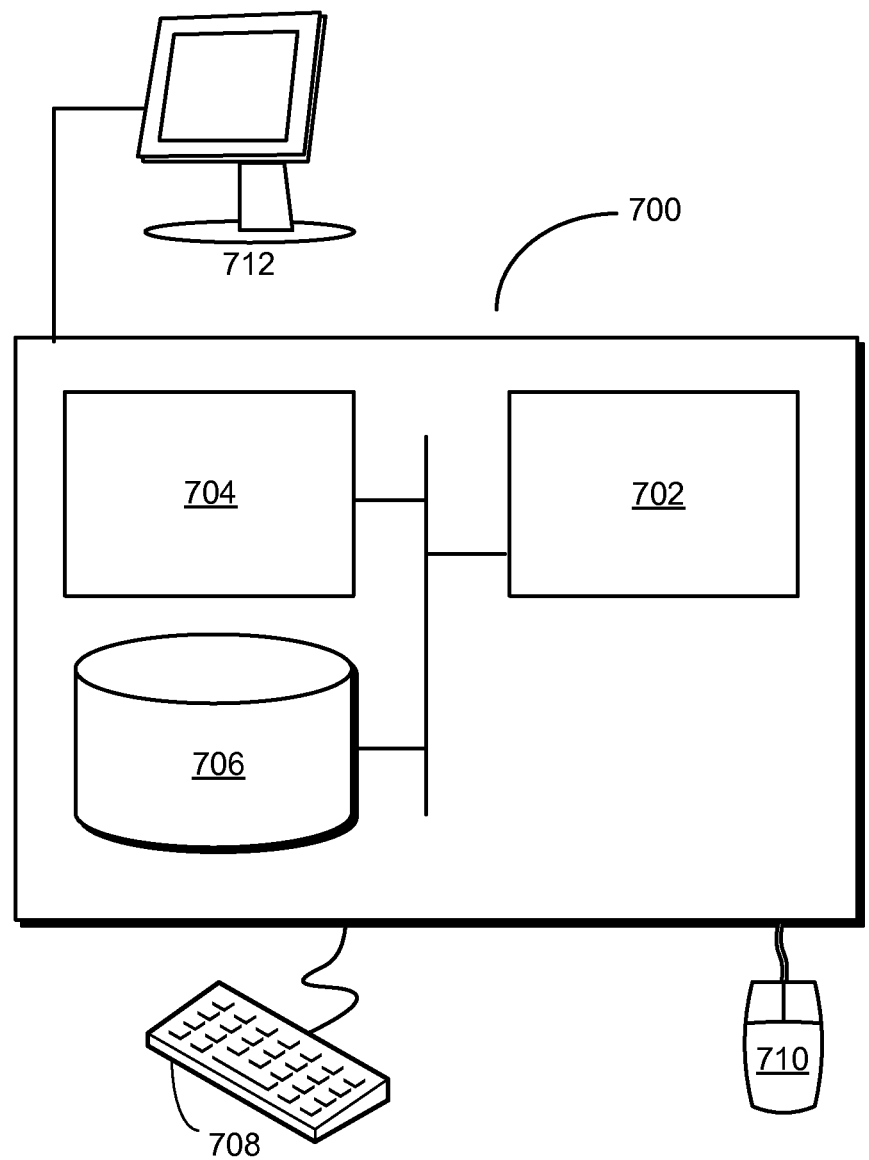
FIG. 7 shows a computer system in accordance with an embodiment.

FIG. 7 shows a computer system 700 in accordance with an embodiment. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for facilitating the development and maintenance of a software program. The system may include an SDK and a runtime system. The SDK and runtime system may obtain a role associated with a dependency of a consumer in the software program on an interface. The SDK and runtime system may also obtain a compatibility policy for the interface. The SDK and runtime system may then use the role and the compatibility policy to manage use of the interface by the consumer in the software program.

In addition, one or more components of computer system 700 may be remotely located and connected to the other components over a network. Portions of the present embodiments (e.g., SDK, runtime system, etc.) may also be located on different nodes of a distributed system that implements the embodiments. For example, the present embodiments may be implemented using a cloud computing system that provides a module system for managing the life cycles of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating development and maintenance of a software program, comprising:
 obtaining a role associated with a dependency of a consumer in the software program on an interface, wherein the role specifies that the consumer calls or implements the interface, and wherein the role is obtained from a definition file that is separate from source code files for the software program;
 obtaining a compatibility policy for the interface from the definition file, wherein the compatibility policy corresponds to a module that provides the interface and comprises a reverse dependency constraint that specifies one or more allowable versions and a second role associated with the one or more allowable versions for the consumer, wherein, based on the second role, the reverse dependency constraint specifies that one of callers of the interface or implementers of the interface can depend on the interface; and
 using the role and the compatibility policy to manage use of the interface by the consumer in the software program by:
  when the second role specifies a caller of the interface, allowing the consumer to use the interface only when the role specifies that the consumer calls one or more functions of the interface and the consumer expresses a dependency on a version of the module that matches the one or more allowable versions, and
  when the second role specifies an implementer of the interface, allowing the consumer to use the interface when the role specifies that the consumer implements the interface and the consumer expresses a dependency on a version of the module that matches the one or more allowable versions.

2. The computer-implemented method of claim 1, wherein using the role and the compatibility policy to facilitate use of the interface by the consumer further involves:
 using the compatibility policy to characterize a change in the interface; if the change is characterized as a source-incompatible change, disabling use of the interface by the implementer; and
 if the change is characterized as a binary-incompatible change, disabling use of the interface by the caller.

3. The computer-implemented method of claim 2,
 wherein the binary-incompatible change comprises a removal of an existing function from the interface, and
 wherein the source-incompatible change comprises an addition of a new function to the interface.

4. The computer-implemented method of claim 1, wherein the consumer is at least one of a class, a package, and a module.

5. The computer-implemented method of claim 1, wherein the role is declared by the consumer or inferred from type declarations in the consumer.

6. The computer-implemented method of claim 1, wherein the compatibility policy is applied to the interface, a set of interfaces, or the software program.

7. A system for facilitating development of a software program, comprising:
 a software development kit (SDK) for the software program; and
 a runtime system for the software program,
 wherein the SDK and the runtime system are configured to:
  obtain a role associated with a dependency of a consumer in the software program on an interface, wherein the role specifies that the consumer calls or implements the interface, and wherein the role is obtained from a definition file that is separate from source code files for the software program;
  obtain a compatibility policy for the interface from the definition file, wherein the compatibility policy corresponds to a module that provides the interface and comprises a reverse dependency constraint that specifies one or more allowable versions and a second role associated with the one or more allowable versions for the consumer, wherein, based on the second role, the reverse dependency constraint specifies that one of callers of the interface or implementers of the interface can depend on the interface; and use the role and the compatibility policy to manage use of the interface by the consumer in the software program by:

when the second role specifies a caller of the interface, allowing the consumer to use the interface only when the role specifies that the consumer calls one or more functions of the interface and the consumer expresses a dependency on a version of the module that matches the one or more allowable versions, and when the second role specifies an implementer of the interface, allowing the consumer to use the interface when the role specifies that the consumer implements the interface and the consumer expresses a dependency on a version of the module that matches the one or more allowable versions.

8. The system of claim 7, wherein using the role and the compatibility policy to facilitate use of the interface by the consumer further involves:

using the compatibility policy to characterize a change in the interface;

if the change is characterized as a source-incompatible change, disabling use of the interface by the implementer; and if the change is characterized as a binary-incompatible change, disabling use of the interface by the caller.

9. The system of claim 8, wherein the binary-incompatible change comprises a removal of an existing function from the interface, and wherein the source-incompatible change comprises an addition of a new function to the interface.

10. The system of claim 7, wherein the consumer is at least one of a class, a package, and a module.

11. The system of claim 7, wherein the compatibility policy is applied to the interface, a set of interfaces, or the software program.

12. A non-transitory computer-readable storage medium storing instructions that when executed by a computer cause the computer to perform a function for facilitating development and maintenance of a software program, the function comprising:

obtaining a role associated with a dependency of a consumer in the software program on an interface, wherein the role specifies that the consumer calls or implements the interface, and wherein the role is obtained from a definition file that is separate from source code files for the software program;

obtaining a compatibility policy for the interface from the definition file, wherein the compatibility policy corresponds to a module that provides the interface and comprises a reverse dependency constraint that specifies one or more allowable versions and a second role associated with the one or more allowable versions for the consumer, wherein, based on the second role, the reverse dependency constraint specifies that one of callers of the interface or implementers of the interface can depend on the interface; and using the role and the compatibility policy to manage use of the interface by the consumer in the software program by:

when the second role specifies a caller of the interface, allowing the consumer to use the interface only when the role specifies that the consumer calls one or more functions of the interface and the consumer expresses a dependency on a version of the module that matches the one or more allowable versions, and when the second role specifies an implementer of the interface, allowing the consumer to use the interface when the role specifies that the consumer implements the interface and the consumer expresses a dependency on a version of the module that matches the one or more allowable versions.

13. The non-transitory computer-readable storage medium of claim 12, wherein using the role and the compatibility policy to facilitate use of the interface by the consumer further involves:

using the compatibility policy to characterize a change in the interface;

if the change is characterized as a source-incompatible change, disabling use of the interface by the implementer; and if the change is characterized as a binary-incompatible change, disabling use of the interface by the caller.

14. The non-transitory computer-readable storage medium of claim 13, wherein the binary-incompatible change comprises a removal of an existing function from the interface; and wherein the source-incompatible change comprises an addition of a new function to the interface.

15. The computer-implemented method of claim 1, wherein using the role and the compatibility policy to manage use of the interface comprises when the second role specifies a caller of the interface, restricting the consumer from using the interface when the role specifies that the consumer implements the interface.

16. The computer-implemented method of claim 1, wherein using the role and the compatibility policy to manage use of the interface comprises when the second role specifies an implementer of the interface, restricting the consumer from using the interface when the role specifies that the consumer calls one or more functions of the interface.

17. The computer-implemented method of claim 1, wherein using the role and the compatibility policy to manage use of the interface comprises when the second role specifies a caller of the interface, allowing the consumer to use the interface when the role specifies that the consumer calls one or more functions of the interface and the consumer expresses a dependency on a version of the module that matches the one or more allowable versions.

18. The computer-implemented method of claim 1, wherein using the role and the compatibility policy to manage use of the interface comprises when the second role specifies an implementer of the interface, allowing the consumer to use the interface when the role specifies that the consumer implements the interface and the consumer expresses a dependency on a version of the module that matches the one or more allowable versions.

* * * * *

UNITED STATES PATENT AND TRADEMARK OFFICE
CERTIFICATE OF CORRECTION

PATENT NO. : 9,454,360 B2  Page 1 of 1
APPLICATION NO. : 12/939634
DATED : September 27, 2016
INVENTOR(S) : Buckley It is certified that error appears in the above-identified patent and that said Letters Patent is hereby corrected as shown below:

In the Claims

In Column 12, Line 28, in Claim 14, delete "interface;" and insert -- interface, --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*